(12) United States Patent
Lacatusu et al.

(10) Patent No.: US 12,177,223 B1
(45) Date of Patent: Dec. 24, 2024

(54) PERMISSION ASSIGNMENT ADVISOR

(71) Applicant: International Business Machines Corporation, Armonk, NY (US)

(72) Inventors: Marian Lacatusu, Bucharest (RO); Florin Lacatusu, Bucharest (RO); Rossella De Gaetano, Rome (IT); Michele Crudele, Rome (IT); Constantin Adrian Mateianu, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 18/349,213

(22) Filed: Jul. 10, 2023

(51) Int. Cl.
    *H04L 9/40* (2022.01)
    *H04L 67/50* (2022.01)

(52) U.S. Cl.
    CPC .......... *H04L 63/102* (2013.01); *H04L 67/535* (2022.05)

(58) Field of Classification Search
None
See application file for complete search history.

(56) References Cited

U.S. PATENT DOCUMENTS

| | | | |
|---|---|---|---|
| 2009/0292743 A1 | 11/2009 | Bigus | |
| 2015/0019982 A1* | 1/2015 | Petitt, Jr. ................. | G06F 21/00 715/738 |
| 2015/0294245 A1* | 10/2015 | Nagar ..................... | G06Q 40/12 705/7.11 |
| 2016/0171195 A1 | 6/2016 | Moloian | |
| 2017/0295181 A1 | 10/2017 | Parimi | |
| 2021/0232603 A1 | 7/2021 | Sundaram | |
| 2021/0288981 A1* | 9/2021 | Numainville ....... | H04L 63/1416 |

OTHER PUBLICATIONS

Muller et al., "Secure Business Processes in Service-Oriented Architectures—A Requirements Analysis", Dec. 1, 2010, IEEE, 2010 Eighth IEEE European Conference on Web Services (2010, pp. 35-42) (Year: 2010).*

"Assigning Resource Management Permissions for Azure Data Lake Store (Part 2)", SQL Chick, Mar. 19, 2018, 7 pages, <https://www.sqlchick.com/entries/2018/3/16/assigning-resource-management-permissions-for-azure-data-lake-store-part-2>.

"Identity Manager 8.1.3—Business Roles Administration Guide", One Identity, Jun. 2020, 61 pages, <https://support.oneidentity.com/technical-documents/identity-manager/8.1.3/business-roles-administration-guide/12#TOPIC-1483712>.

"Oracle Identity Analytics Business Administrator's Guide: 11g Release 1", Oracle, Aug. 2010, 148 pages, <https://docs.oracle.com/cd/E27119_01/doc.11113/e23124/businessadministratorsguideprintable33.html>.

(Continued)

*Primary Examiner* — Davoud A Zand
(74) *Attorney, Agent, or Firm* — Edward J. Wixted, III (57) ABSTRACT

A method, computer program product, and computer system are provided for recommending user role assignments. An action executed by a user from among a plurality of users on a network is identified. Data corresponding to the identified action is compiled and consolidated in a database of historical actions associated with the plurality of users. A trend or an anomaly is identified within the compiled and consolidated data based on a role and permissions associated with the user. A recommendation is generated for reassignment of new permissions or a new role associated with the user based on the identified trend or anomaly.

20 Claims, 4 Drawing Sheets

(56) References Cited

OTHER PUBLICATIONS

Colantinio, Alessandro, "Role Mining Techniques To Improve RBAC Administration", Printed Apr. 19, 2023, 207 pages, <http://www.matfis.uniroma3.it/Allegati/Dottorato/TESI/colanton/colantonio.pdf>.

Torrente, Marina Boyero, "Design and Deployment of an Access Control Module for Data Lakes", Bachelor Thesis, Carlos III University of Madrid, 2022, 84 pages, <https://e-archivo.uc3m.es/handle/10016/36334>.

Uddin et al., "A dynamic access control model using authorising workflow and task-role based access control", Digital Object Identifier 10.1109/ACCESS.2017, 2017, 14 pages,. <https://ieeexplore.ieee.org/document/8868170>.

* cited by examiner

PERMISSION ASSIGNMENT ADVISOR

FIELD

This disclosure relates generally to the field of data processing, and more particularly to data access control.

BACKGROUND

Data access control is a technique used to regulate employees' access to files in an organization. Data access control involves leveraging the principle of least privilege (POLP). Employees' access rights are managed based on their roles in the organization, and limits are placed on the data and programs to which users may have access.

SUMMARY

Embodiments relate to a method, system, and computer program product for recommending user role assignments. According to one aspect, a method for recommending user role assignments is provided. The method may include identifying an action executed by a user from among a plurality of users on a network. Data corresponding to the identified action is compiled and consolidated in a database of historical actions associated with the plurality of users. A trend or an anomaly is identified within the compiled and consolidated data based on a role and permissions associated with the user. A recommendation is generated for reassignment of new permissions or a new role associated with the user based on the identified trend or anomaly.

According to another aspect, a computer system for recommending user role assignments is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying an action executed by a user from among a plurality of users on a network. Data corresponding to the identified action is compiled and consolidated in a database of historical actions associated with the plurality of users. A trend or an anomaly is identified within the compiled and consolidated data based on a role and permissions associated with the user. A recommendation is generated for reassignment of new permissions or a new role associated with the user based on the identified trend or anomaly.

According to yet another aspect, a computer program product for recommending user role assignments is provided. The computer program product may include one or more computer-readable storage devices and program instructions stored on at least one of the one or more tangible storage devices, the program instructions executable by a processor. The program instructions are executable by a processor for performing a method that may accordingly include identifying an action executed by a user from among a plurality of users on a network. Data corresponding to the identified action is compiled and consolidated in a database of historical actions associated with the plurality of users. A trend or an anomaly is identified within the compiled and consolidated data based on a role and permissions associated with the user. A recommendation is generated for reassignment of new permissions or a new role associated with the user based on the identified trend or anomaly.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to data access control. The following described exemplary embodiments provide a system, method, and computer program product to, among other things, recommend user access roles and permissions. Therefore, some embodiments have the capacity to improve the field of computing by allowing for automatically determining needed roles and permissions for users, recommending appropriate roles in advance for an organization, detecting anomalies in user behavior, and alerting an administrator to recommend changes in permission.

As previously described, data access control is a technique used to regulate employees access to files in an organization. Data access control involves leveraging the principle of least privilege (POLP). Employees' access rights are managed based on their roles in the organization, and limits are places on the data and programs to which users may have access. However, user access control requires maintaining appropriate access to programs, data, and other tools. Users may be assigned privileges that are either too high or too low for their role. It may be advantageous, therefore, to automatically discover which permissions a user needs based on his activities within the system and discover suspicious activities that should not translate into granted permissions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
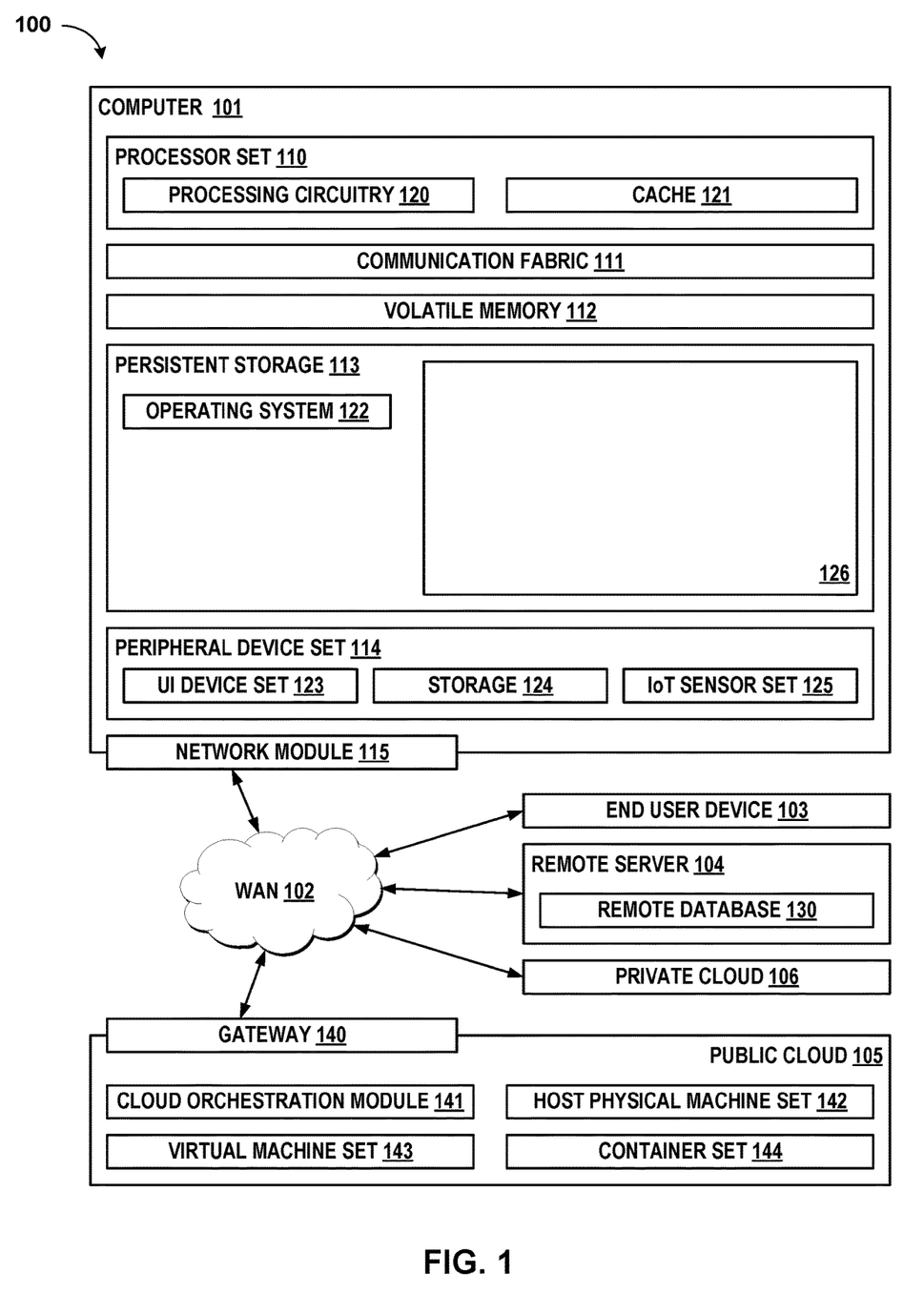
FIG. 1 illustrates a networked computer environment according to at least one embodiment.

The following described exemplary embodiments provide a system, method and computer program product that recommends user role assignments. Referring now to FIG. 1, Computing environment 100 contains an example of an environment for the execution of at least some of the computer code involved in performing the inventive methods, such as Role Assignment 126. In addition to Role Assignment 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Role Assignment 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Role Assignment 126 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Role Assignment 126 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
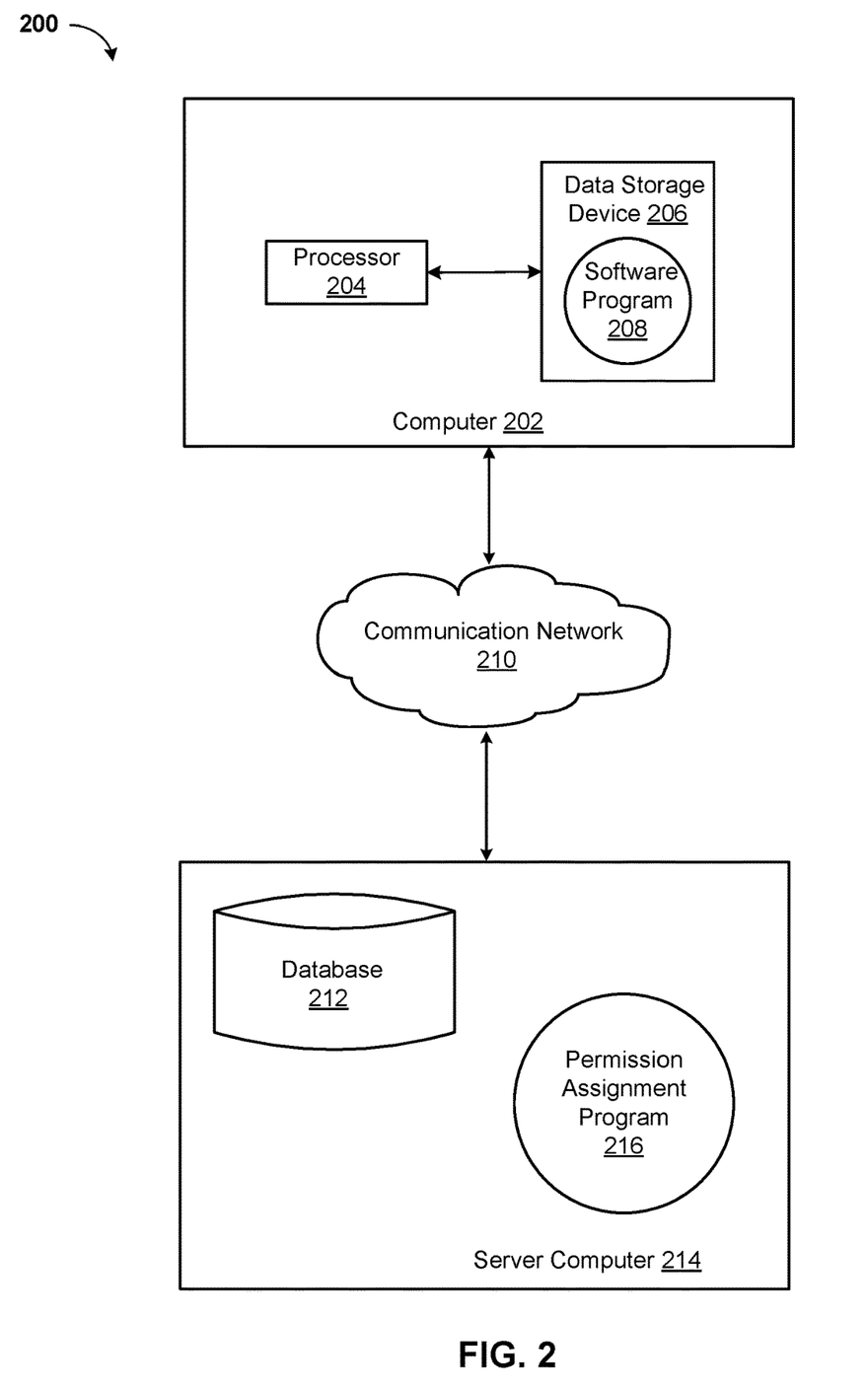
FIG. 2 illustrates a networked computer environment according to at least one embodiment.

Referring now to FIG. 2, a functional block diagram of a networked computer environment illustrating a role assignment system 200 (hereinafter "system") for recommending user role assignments. It should be appreciated that FIG. 2 provides only an illustration of one implementation and does not imply any limitations with regard to the environments in which different embodiments may be implemented. Many modifications to the depicted environments may be made based on design and implementation requirements.

The system 200 may include a computer 202 and a server computer 214. The computer 202 may communicate with the server computer 214 via a communication network 210 (hereinafter "network"). The computer 202 may include a processor 204 and a software program 208 that is stored on a data storage device 206 and is enabled to interface with a user and communicate with the server computer 214. The computer 202 may be, for example, a mobile device, a telephone, a personal digital assistant, a netbook, a laptop computer, a tablet computer, a desktop computer, or any type of computing devices capable of running a program, accessing a network, and accessing a database.

The server computer 214, which may be used for recommending user role assignments is enabled to run a Permission Assignment Program 216 (hereinafter "program") that may interact with a database 212. The Permission Assignment Program is explained in more detail below with respect to FIG. 4. In one embodiment, the computer 202 may operate as an input device including a user interface while the program 216 may run primarily on server computer 214. In an alternative embodiment, the program 216 may run primarily on one or more computers 202 while the server computer 214 may be used for processing and storage of data used by the program 216. It should be noted that the program 216 may be a standalone program or may be integrated into a larger permission assignment program.

It should be noted, however, that processing for the program 216 may, in some instances be shared amongst the computers 202 and the server computers 214 in any ratio. In another embodiment, the program 216 may operate on more than one computer, server computer, or some combination of computers and server computers, for example, a plurality of computers 202 communicating across the network 210 with a single server computer 214. In another embodiment, for example, the program 216 may operate on a plurality of server computers 214 communicating across the network 210 with a plurality of client computers. Alternatively, the program may operate on a network server communicating across the network with a server and a plurality of client computers.

The network 210 may include wired connections, wireless connections, fiber optic connections, or some combination thereof. In general, the network 210 can be any combination of connections and protocols that will support communications between the computer 202 and the server computer 214. The network 210 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a private network, an ad hoc network, an intranet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
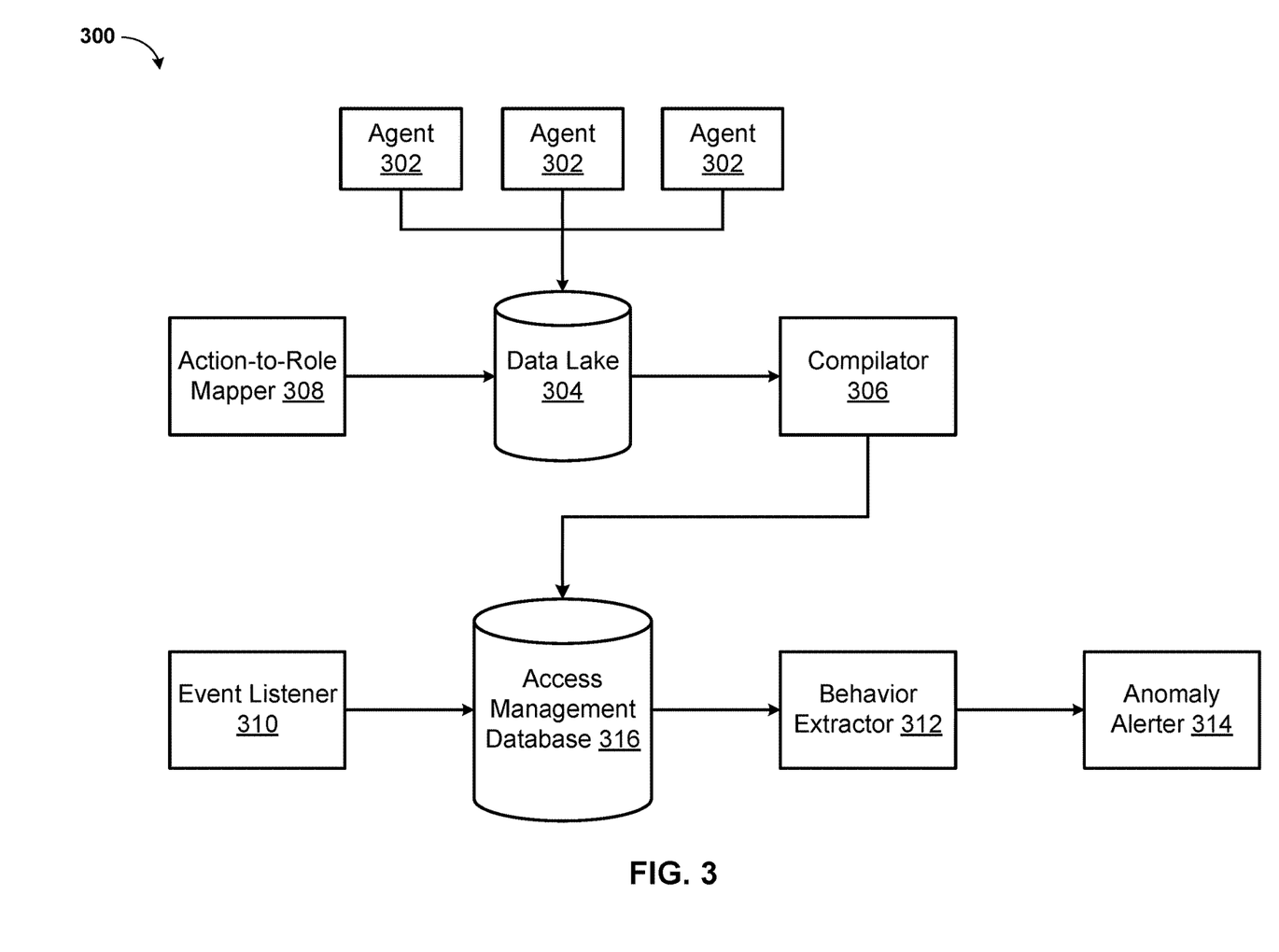
FIG. 3 is a block diagram of a system for recommending user role assignments, according to at least one embodiment.

Referring now to FIG. 3, a block diagram of a permission assignment system 300 is depicted according to one or more embodiments. The permission assignment system 300 may include, among other things, one or more agents 302, a data lake 304, a compilator 306, an action-to-role mapper 308, event listener 310, a behavior extractor 312, and an anomaly alerter 314.

The one or more agents 302 may crawl audit logs of one or more systems to identify actions executed by users associated with each system. The one or more agents 302 may propagate this information to the data lake 304.

The compilator 306 may periodically look at data in the data lake 304 for a specific or customizable time range. The compilator 306 may join and consolidate data in the data lake 304 into a representation of n-tuples, such as [userId, role, actions, tool, status (i.e., success or access denied), last occurrence]. Such n-tuples compiled by the compilator 306 may be stored in an access management database 316 that may act as a permission database that holds an access table.

one or more ID and Access Management systems where the assignment between user id and roles/permissions is defined and stored.

The action-to-role mapper 308 may be a correlation engine that may map an action in a log stored in the data lake 304 to roles or permissions in an identification system. For example, a user with read-only permissions may only be permitted to run GET APIs, a user with operator permissions may run GET/PUT/POST on some APIs, and a user with administrator access may be permitted to run any API.

The event listener 310 may be configured to wait for and respond to certain events. For example, the event listener 310 may listen for events on the ID system that populates the assigned permission table on the access management database 316 ([userid, permission/role, tool, timestamp granted, timestamp revoked]). The event listener 310 may also listen for events on a register of company employees and their hierarchy. The event listener 310 may populate a job table on the access management database 316 ([userid, job, manager id, last updated]) and may use a natural language processing engine to deduplicate jobs.

The behavior extractor 312 may crawl the access management database 316 and correlate data with the data extracted from the register of company employees. The behavior extractor 312, therefore, may look for trends and anomalies associated with a user's actions. The behavior extractor 312 may compare data associated with user activity against the access management database 316. If an ID for the user does not exist in the access management database 316, the behavior extractor 312 may send data to the anomaly alerter 314, including a user ID, an identification of a tool or program last accessed by the user, a return code, and a recommendation. The anomaly alerter 314 may alert a system administrator that a possible security breach is in progress. If the user ID does, however, exist in the access management database 316, the behavior extractor 312 retrieves a list of user IDs and permissions of users with the same manager or role from the employee register and joins the result with the access management database 316. If the user has not accessed the particular tool or program in a given timeframe, the data is sent to the anomaly alerter 314 with a recommendation to grant the user access and permissions but to revise user access and permissions for the next time interval. If the user has used the tool or program, the behavior extractor 312 determines whether the permissions match the actual role. If "yes," then action may not need to be taken. If "no," the behavior extractor 312 may send the data to the anomaly alerter 314 with a recommendation to increase or decrease user access and permissions.

The anomaly alerter 314 may send an alert to an administrator of the permission assignment system 300 for each anomaly found by the behavior extractor 312. The anomaly alerter 314 may verify the permission or role assignments with a recommended action. For example, the anomaly alerter 314 may recommend verifying either that a given user's permission was not granted in error or whether or not a user temporarily assigned to a project requires such permission.

Figure 4:
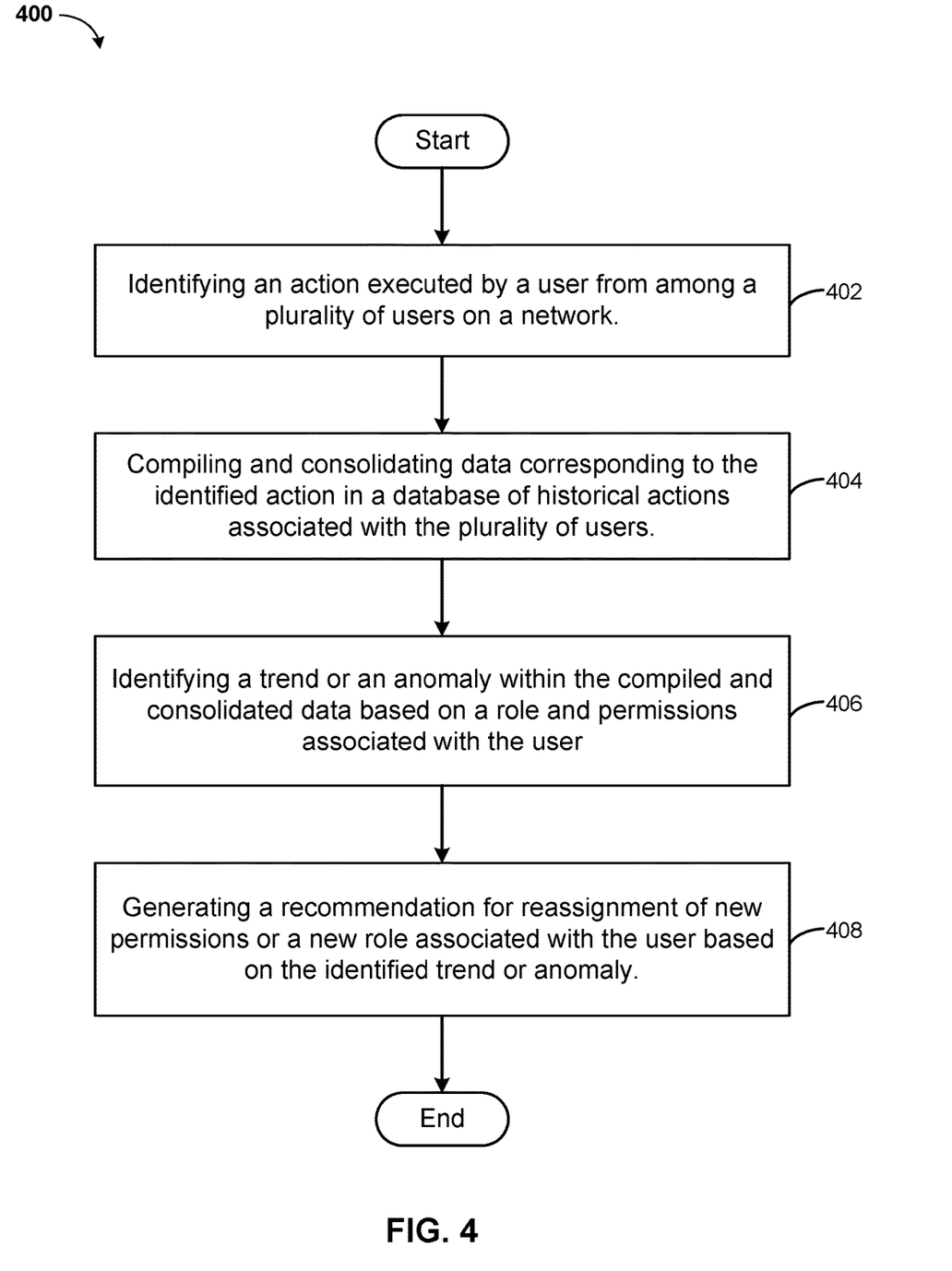
FIG. 4 is an operational flowchart illustrating the steps carried out by a program that recommends user role assignments, according to at least one embodiment.

Referring now to FIG. 4, an operational flowchart illustrating the steps of a method 400 carried out by a program that recommends user roles is depicted. The method 400 may be described with the aid of the exemplary embodiments of FIGS. 1-3.

At 402, the method 400 may include identifying an action executed by a user from among a plurality of users on a network. The action executed by the user corresponds to actions of the user on a network or interactions by the user with a piece of software. In operation, agents 302 (FIG. 3) may detect that a user of a computer 202 (FIG. 2) is interacting with the software program 208 (FIG. 2) on the computer 202.

At 404, the method 400 may include compiling and consolidating data corresponding to the identified action in a database of historical actions associated with the plurality of users. The data corresponding to the identified action comprises a user identification, an identification of a tool or a program last accessed by the user, and a return code generated by the tool or the program. In operation, the action-to-role mapper 308 (FIG. 3) may determine the interactions the user of the computer 202 (FIG. 2) has had with the software program 208 (FIG. 2). The action-to-role mapper 308 may store unstructured data about such interactions in the data lake 304 (FIG. 4). The compilator 306 may compile the data from several users and their interactions within the data lake 304 and store the compiled data in the access management database 316 (FIG. 3) to build a profile of expected user roles and permissions.

At 406, the method 400 may include identifying a trend or an anomaly within the compiled and consolidated data based on a role and permissions associated with the user. The trend or anomaly is determined by identifying whether the action executed by the user is appropriate based on the permissions and the role associated with the user and data corresponding to the historical actions of similar users from among the plurality of users within the database of historical actions. In operation, the behavior extractor 312 (FIG. 3) may identify trends and anomalies within the access management database 316 (FIG. 3).

At 408, the method 400 may include generating a recommendation for reassignment of a new permission or a new role associated with the user based on the identified trend or anomaly. The recommendation is generated based on crawling a register associated with the plurality of users, determining a hierarchy within the register, and identifying similar users to the user. The permissions or the role associated with the user may be reassigned based on the generated recommendation. Additionally, a system administrator may be alerted based on the generated recommendation. In operation, the behavior extractor 312 (FIG. 3) may generate recommendations based on the trends and anomalies within the data in the access management database 316 (FIG. 3) for changing roles and permissions associated with users. The anomaly alerter 314 (FIG. 3) may receive the recommendation from the behavior extractor 312 (FIG. 3) and may cause a system administrator to be alerted if a user requires increased or decreased permissions.

It may be appreciated that FIG. 4 provides only an illustration of one implementation and does not imply any limitations with regard to how different embodiments may be implemented. Many modifications to the depicted environments may be made based on design and implementation requirements.

Some embodiments may relate to a system, a method, and/or a computer program product at any possible technical detail level of integration. The computer program product may include a computer-readable non-transitory storage medium (or media) having computer readable program instructions thereon for causing a processor to carry out operations.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer program product may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of recommending user role assignments, executable by a processor, comprising:
   identifying an action executed by a user from among a plurality of users on a network;
   compiling and consolidating data corresponding to the identified action in a database of historical actions associated with the plurality of users;
   identifying a trend or an anomaly within the compiled and consolidated data based on a role and permissions associated with the user; and
   generating a recommendation for reassignment of new permissions or a new role associated with the user based on the identified trend or anomaly.

2. The method of claim 1, further comprising reassigning the permissions or the role associated with the user based on the generated recommendation.

3. The method of claim 1, wherein the action executed by the user corresponds to actions of the user on a network or interactions by the user with a piece of software.

4. The method of claim 1, further comprising alerting a system administrator based on the generated recommendation.

5. The method of claim 1, wherein the trend or anomaly is determined by identifying whether the action executed by the user is appropriate based on the permissions and the role associated with the user and data corresponding to the historical actions of similar users from among the plurality of users within the database of historical actions.

6. The method of claim 1, wherein the recommendation is generated based on crawling a register associated with the plurality of users, determining a hierarchy within the register, and identifying similar users to the user.

7. The method of claim 1, wherein the data corresponding to the identified action comprises a user identification, an identification of a tool or a program last accessed by the user, and a return code generated by the tool or the program.

8. A computer system for recommending user role assignments, the computer system comprising:
one or more computer-readable storage media configured to store computer program code; and
one or more computer processors configured to access said computer program code and operate as instructed by said computer program code, said computer program code including:
first identifying code configured to cause the one or more computer processors to identify an action executed by a user from among a plurality of users on a network;
respective compiling and consolidating code configured to cause the one or more computer processors to compile and consolidate data corresponding to the identified action in a database of historical actions associated with the plurality of users;
second identifying code configured to cause the one or more computer processors to identify a trend or an anomaly within the compiled and consolidated data based on a role and permissions associated with the user; and
generating code configured to cause the one or more computer processors to generate a recommendation for reassignment of new permissions or a new role associated with the user based on the identified trend or anomaly.

9. The computer system of claim 8, further comprising reassigning code stored on the one or more computer-readable storage media, the reassigning code configured to cause the one or more computer processors to reassign the permissions or the role associated with the user based on the generated recommendation.

10. The computer system of claim 8, wherein the action executed by the user corresponds to actions of the user on a network or interactions by the user with a piece of software.

11. The computer system of claim 8, further comprising alerting code stored on the one or more computer-readable storage media, the alerting code configured to cause the one or more computer processors to alert a system administrator based on the generated recommendation.

12. The computer system of claim 8, wherein the trend or anomaly is determined by identifying whether the action executed by the user is appropriate based on the permissions and the role associated with the user and data corresponding to the historical actions of similar users from among the plurality of users within the database of historical actions.

13. The computer system of claim 8, wherein the recommendation is generated based on crawling a register associated with the plurality of users, determining a hierarchy within the register, and identifying similar users to the user.

14. The computer system of claim 8, wherein the data corresponding to the identified action comprises a user identification, an identification of a tool or a program last accessed by the user, and a return code generated by the tool or the program.

15. A computer program product for recommending user role assignments, comprising:
one or more computer-readable storage devices; and
program instructions stored on at least one of the one or more computer-readable storage devices, the program instructions configured to cause one or more computer processors to:
identify an action executed by a user from among a plurality of users on a network;
compile and consolidate data corresponding to the identified action in a database of historical actions associated with the plurality of users;
identify a trend or an anomaly within the compiled and consolidated data based on a role and permissions associated with the user; and
generate a recommendation for reassignment of new permissions or a new role associated with the user based on the identified trend or anomaly.

16. The computer program product of claim 15, wherein the program instructions stored on the one or more computer-readable storage devices are further configured to cause the one or more computer processors to reassign the permissions or the role associated with the user based on the generated recommendation.

17. The computer program product of claim 15, wherein the action executed by the user corresponds to actions of the user on a network or interactions by the user with a piece of software.

18. The computer program product of claim 15, wherein the program instructions stored on the one or more computer-readable storage devices are further configured to cause the one or more computer processors to alert a system administrator based on the generated recommendation.

19. The computer program product of claim 15, wherein the trend or anomaly is determined by identifying whether the action executed by the user is appropriate based on the permissions and the role associated with the user and data corresponding to the historical actions of similar users from among the plurality of users within the database of historical actions.

20. The computer program product of claim 15, wherein the recommendation is generated based on crawling a register associated with the plurality of users, determining a hierarchy within the register, and identifying similar users to the user.

* * * * *